Aug. 18, 1931.　　　H. KLEIN　　　1,819,713
UTENSIL SUPPORT
Filed Sept. 6, 1929
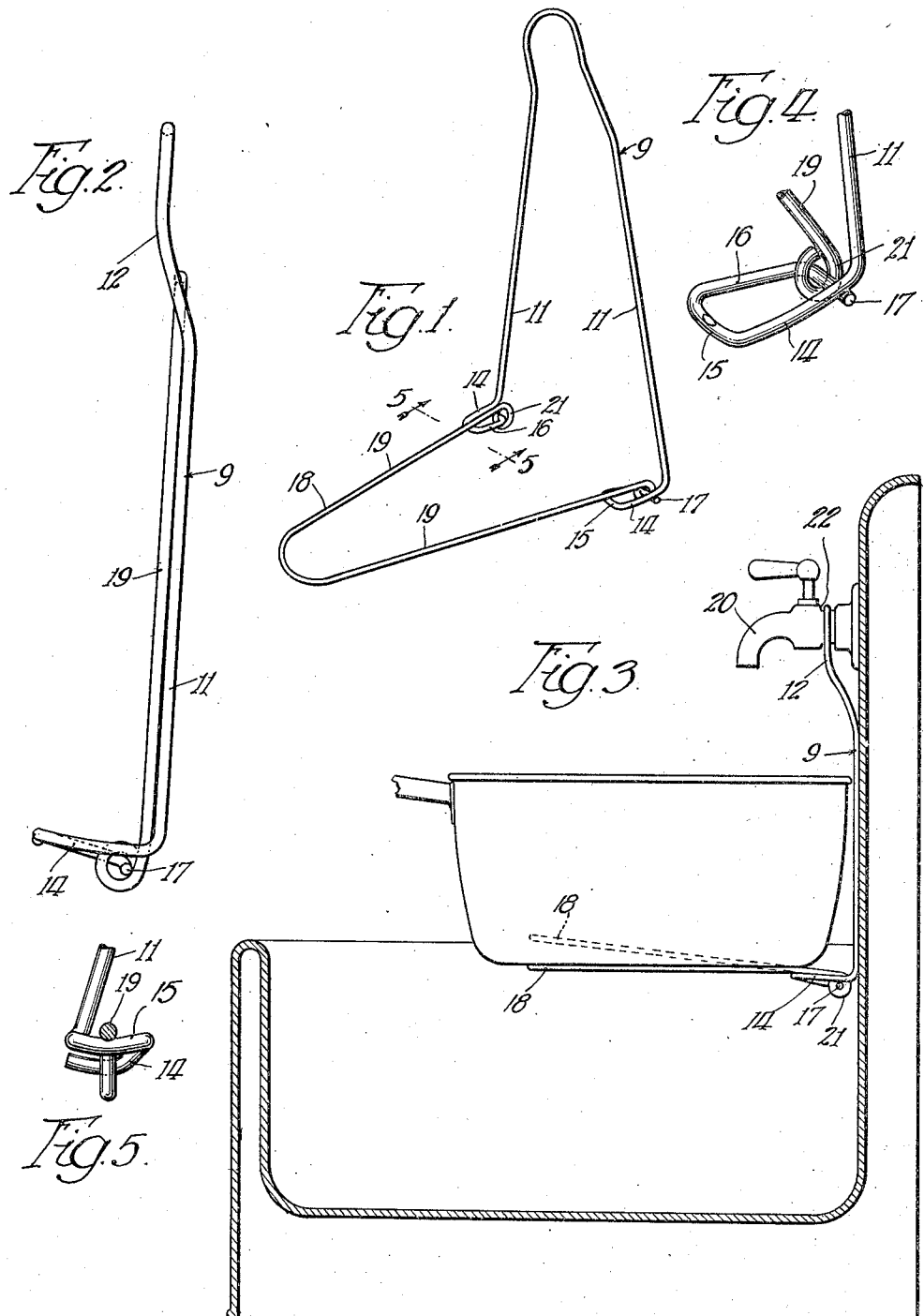
Inventor
Herman Klein
By George E. Mueller Atty.

Patented Aug. 18, 1931

1,819,713

UNITED STATES PATENT OFFICE

HERMAN KLEIN, OF CHICAGO, ILLINOIS

UTENSIL SUPPORT

Application filed September 6, 1929. Serial No. 390,683.

My invention relates to a utensil support, and more particularly to a device for supporting a utensil in a sink.

In working about the kitchen it frequently happens that a housewife wishes to put some water in a kettle having a black or charred bottom. To set such a kettle in the sink while filling it would soil and discolor the sink and at the same time, there is usually a considerable amount of moisture in the sink which will wet the bottom of the kettle and when the kettle is subsequently placed on the stove it causes it to steam and rust the top of the range due to the moisture condensing thereon from the steam and the heat of the flame.

The uses to which such a support may be put are numerous. In many cases, for instance, it is desirable to run water through material in a colander and allow it to drain, like in the washing of leafy vegetables. The colander may be placed on the support and the water allowed to run freely without obstruction of the apertures in the colander, as would be the case if it were placed on the bottom of the sink. There may be cases when the sink is filled with dishes making it desirable to have a support on which to place a kettle or other utensil while filling it with water.

An object of my invention is to provide a new and improved utensil support for a sink.

A further object is to provide a support which may be readily placed in such a position as to be out of the way.

A further object is to provide a rugged and sturdy utensil support which can be easily and economically manufactured.

In accordance with the general features of the invention a support is provided having a horizontal base for supporting a utensil which may be readily moved to a vertical position and retained there by its own weight when not in use. A complete understanding of the invention may be had by referring to the following specification taken in conjunction with the accompanying drawings.

Fig. 1 is a perspective view of a utensil support embodying the invention.

Fig. 2 is a side elevation showing the support in position when not in use.

Fig. 3 is a side elevation of the apparatus showing it suspended from a faucet in a sink.

Fig. 4 is an enlarged perspective of one of the hinges, and

Fig. 5 is a detail view taken on line 5—5 of Fig. 1.

The support consists in general of a vertical U-shaped member or bracket 9 having downwardly extending legs 11. The upper portion of the end of the bracket 9 is bent forwardly as shown at 12 in Figs. 2 and 3, for the purpose to be described hereafter.

Each of the downwardly extending legs 11 of bracket 9 is provided with a forwardly extending loop consisting of a forwardly extending portion 14, a laterally extending portion 15, a rearwardly extending portion 16, and a laterally extending portion 17 which terminates under the portion 14. A horizontal base member 18 having rearwardly extending legs 19 co-operates with bracket member 9 to support a utensil. The ends of legs 19 are formed into small rings or eyes 21 which surround the laterally extending portions 17 of bracket member 9 and constitute a hinged connection between these members. When the base member 18 is in its operative or supporting position the legs 19 rest upon the laterally extending portions 15 of the forwardly extending loops exerting a downward pressure upon this portion and an upward pressure on the portion 17. Due to the fact that portion 17 terminates underneath the portion 14 the upward movement of portion 17 is limited when a weight is placed upon the support. The laterally extending portion 15 may be slightly bowed as shown in Fig. 5 to center the legs 19 of the base member and prevent them from sliding off the loops. The entire support may be made of quite rigid heavy wire bent into the shape shown. In order to prevent a utensil from sliding off of the base member this member is constructed to incline upwardly slightly as shown in dotted lines in Fig. 3 when not in use. When a heavy utensil is placed upon the base member it will be slightly depressed causing the base member to assume a horizontal position.

The support should be made of material having sufficient rigidity that the forward end of the base member will not be depressed lower than the horizontal. The upper end of bracket 9 is made comparatively narrower than the lower portion and is adapted to be hooked over a faucet 20. In most cases the upper portion of bracket 9 will extend to shoulder 22 of the faucet. However, due to the fact that this end is bent forwardly and out of the plane of the lower portion as shown there will be no tendency for this portion to slide forwardly on the faucet even though it does not rest against a shoulder such as 22 because the pivoting point of the entire support is at the lowermost end of legs 11 of the bracket. When the support is not in actual use the base member 18 may be pivoted upwardly into the position shown in Fig. 2 so as to be completely out of the way. In this position it will be noted that the upper end of base member 18 is rearwardly of its pivoting point about portion 17 and as a result it will automatically sustain itself in this position due to gravity. In order to place the bracket in position for use it is only necessary to move the base member 18 forwardly, until it is forward of its pivoting point about portion 17 from where it will fall to its supporting position of its own accord.

The embodiment of the invention described is only a practical and convenient form of the invention and it will be understood that many modifications could be made therein without departing from the spirit and scope of the invention.

I claim:

1. A utensil support comprising a U-shaped arm having downwardly extending legs, a forwardly extending loop on each of said legs, a second U-shaped member having legs pivotally connected to the rearward side of said loops and normally resting upon the forward side of said loops thereby forming a support for a utensil.

2. A utensil support comprising a U-shaped arm having downwardly extending legs, a loop on each of said legs consisting of a forwardly extending portion, a laterally extending portion, a rearwardly extending portion, and a second laterally extending portion, terminating under the forwardly extending portion, a U-shaped base for supporting a utensil, said base having legs pivotally secured to said second laterally extending portions and adapted to rest upon the first laterally extending portions when in operative position.

3. A utensil support freely suspended from a supporting means, said utensil support comprising a U-shaped vertical member, a U-shaped base member pivotally secured thereto, the upper end of said vertical member being bent forwardly and constricted at the bent portion whereby the base member when in a vertical position will be supported on the vertical legs in a position rearwardly of the pivot point of said member, the utensil support swinging freely at the supporting means.

4. A utensil support comprising a U-shaped arm having a lower portion adapted to lie flat against a wall and an upper freely suspended portion extending forwardly therefrom whereby the point of support of said utensil support is more nearly in the vertical plane of the center of gravity of the whole, thereby preventing slipping on a supporting member, a U-shaped base member, a pair of hinges interconnecting said member, and means for limiting the relative angular movement of said member to thereby support said base member in a substantially horizontal position.

5. A utensil support comprising a U-shaped arm having downwardly extending legs, a forwardly extending loop on each of said legs, a second U-shaped member having legs pivotally connected to the rearward side of said loops and normally resting upon the forward side of said loops thereby forming a support for a utensil, the rearward sides of said loops extending under a forwardly extending portion of said loops to reinforce said rearward sides.

6. A utensil support comprising a U-shaped arm having downwardly extending legs, a loop on each of said legs consisting of a forwardly extending portion, a laterally extending portion, a rearwardly extending portion, and a second laterally extending portion terminating under the forwardly extending portion, and a U-shaped base for supporting a utensil, said base having legs pivotally secured to one of the laterally extending portions of the loops of the first U-shaped member and adapted to rest against the other laterally extending portion when in supporting position.

In witness whereof I hereunto subscribe my name this 9th day of August, 1929.

HERMAN KLEIN.